F. L. FAIRCHILD.
Machine for Rolling Wrought-Metal Tires for Traction-Wheels.

No. 223,122. Patented Dec. 30, 1879.

Witnesses:
E. E. Massow
Georgie

Inventor:
Frank L. Fairchild
by M. Bailey
his attorney

UNITED STATES PATENT OFFICE.

FRANK L. FAIRCHILD, OF MOUNT VERNON, OHIO.

IMPROVEMENT IN MACHINES FOR ROLLING WROUGHT-METAL TIRES FOR TRACTION-WHEELS.

Specification forming part of Letters Patent No. 223,122, dated December 30, 1879; application filed October 27, 1879.

*To all whom it may concern:*

Be it known that I, FRANK L. FAIRCHILD, of Mount Vernon, Knox county, Ohio, have invented certain new and useful Improvements in Machines for Rolling Wrought-Metal Tires for Traction-Wheels, of which the following is a specification.

My invention relates particularly to rolls for the manufacture of wrought-metal tires for traction-wheels; and it consists in rolls formed with grooves such as hereinafter described, whereby the blank passed through said grooves is reduced to the shape of a tire having a flat smooth inner face and an outer face formed in one with solid transverse ribs which project from and are backed solidly by the full thickness of the body of the tire.

Figure 1:
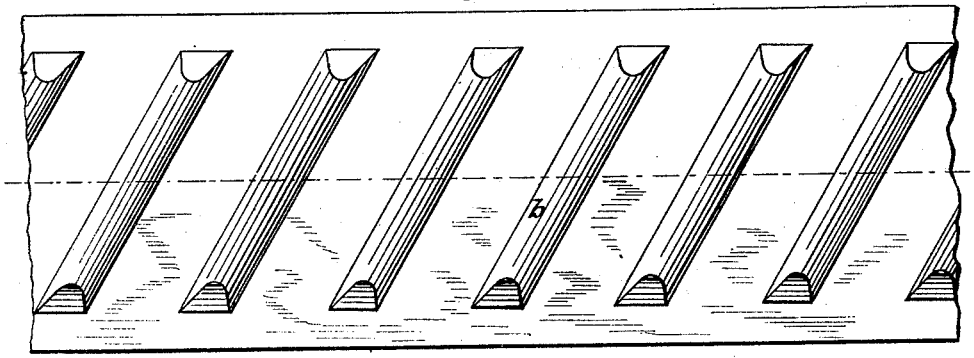
Figure 2:
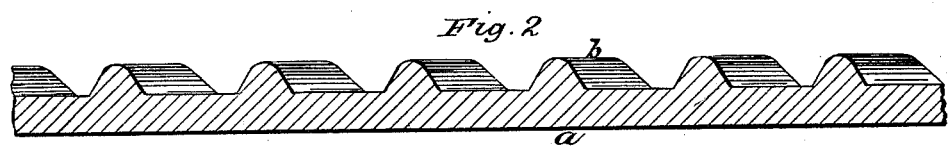

In Figures 1 and 2 I have represented, in plan and longitudinal section, a tire or part of a tire having the shape and configuration which I prefer. In this tire the solid transverse ribs $b$ do not extend the full width of the tire, the object being to leave at one or both ends of the ribs a plain flat tire-surface, which will receive, for instance, the acting-faces of the brake that is usually applied to the traction-wheel. The under or inner face, $a$, of the tire is flat, smooth, and continuous, being adapted to fit upon and encircle the felly of the wheel to which the tire may be applied.

Figure 3:
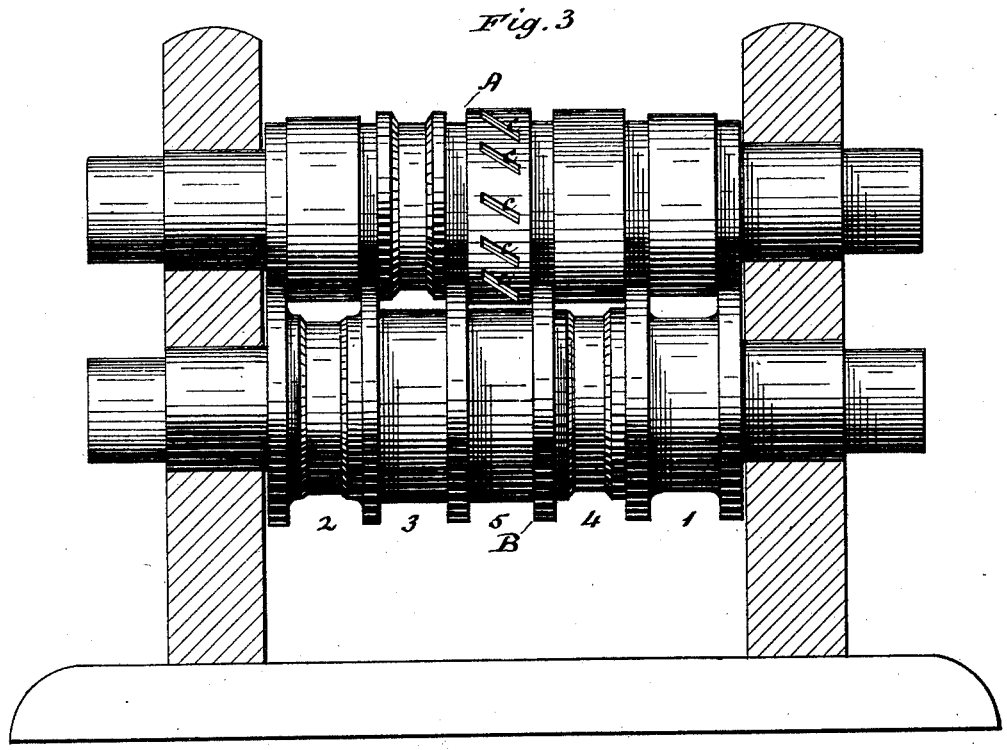

In Fig. 3 is shown, in front elevation, a pair of rollers, A B, properly mounted in a frame, and formed with a series of grooves, through which the wrought-metal billet or blank is passed in order to form a tire such as shown in Figs. 1 and 2.

Five passes are requisite in these rolls in order to form the tire. The billet is first passed through groove 1, where it assumes the form of a flat bar with its bottom edges slightly rounded. Thence it is passed through die 2, in which the bar is somewhat drawn or reduced in thickness, and at the same time has formed on its upper face a longitudinal central rib of slight elevation. The bar is still further drawn and reduced in thickness, and its central rib is still further raised by passing through groove 3, and a further drawing action takes place in groove 4.

The bar, having the shape and dimensions in cross-section indicated by groove 4, now passes through the final or finishing groove 5, which is shaped to form a flat bar, and has in one of its acting-faces a series of mortises, $c$, of the size and configuration intended for the finished transverse ribs of the tire, which mortises act on the raised longitudinal central part formed on the tire or bar in the preceding grooves. In this groove the work is completed, the bar being reduced to the ultimate shape desired, with a flat smooth inner face and an outer face provided with a series of transverse solid ribs.

It is manifest that the shape and dimensions of the ribs may be varied by varying the shape and dimensions of the rib forming mortises in the finishing-groove.

I do not here claim a traction-wheel tire of wrought metal provided with a smooth flat continuous inner face and an outer face formed in one with solid transverse ribs which project from and are solidly backed by the full thickness of the body of the tire. This I have claimed in a separate application of even date herewith, and my present application is directed to machinery for rolling such a tire. I have described only the rolls, and have not deemed it necessary to show or describe the means for driving or actuating the same, inasmuch as it is manifest that any of the ordinary and well-known instrumentalities may be employed for the purpose.

What I claim, and desire to secure by Letters Patent, is—

The rolls formed with grooves, such as shown and described, for making wrought-metal externally-ribbed traction-wheel tires, substantially as set forth.

In testimony whereof I have hereunto set my hand this 23d day of October, A. D. 1879.

FRANK L. FAIRCHILD.

Witnesses:
S. J. BUTLER,
JNO. G. JENNINGS.